Sept. 4, 1945.　　　　W. O. LA FAVE　　　　2,384,181

EQUILIBRIUM GRAIN SEPARATOR

Filed July 16, 1943

INVENTOR.
William O. LaFave
BY
Victor J. Evans & Co.
ATTORNEYS

Patented Sept. 4, 1945

2,384,181

UNITED STATES PATENT OFFICE 2,384,181

EQUILIBRIUM GRAIN SEPARATOR

William O. La Fave, Anaconda, Mont.

Application July 16, 1943, Serial No. 494,985

7 Claims. (Cl. 209—474)

My invention relates to the separation of grain from thrashed straw, and has among its objects and advantages the provision of an improved grain separator.

Figure 1:
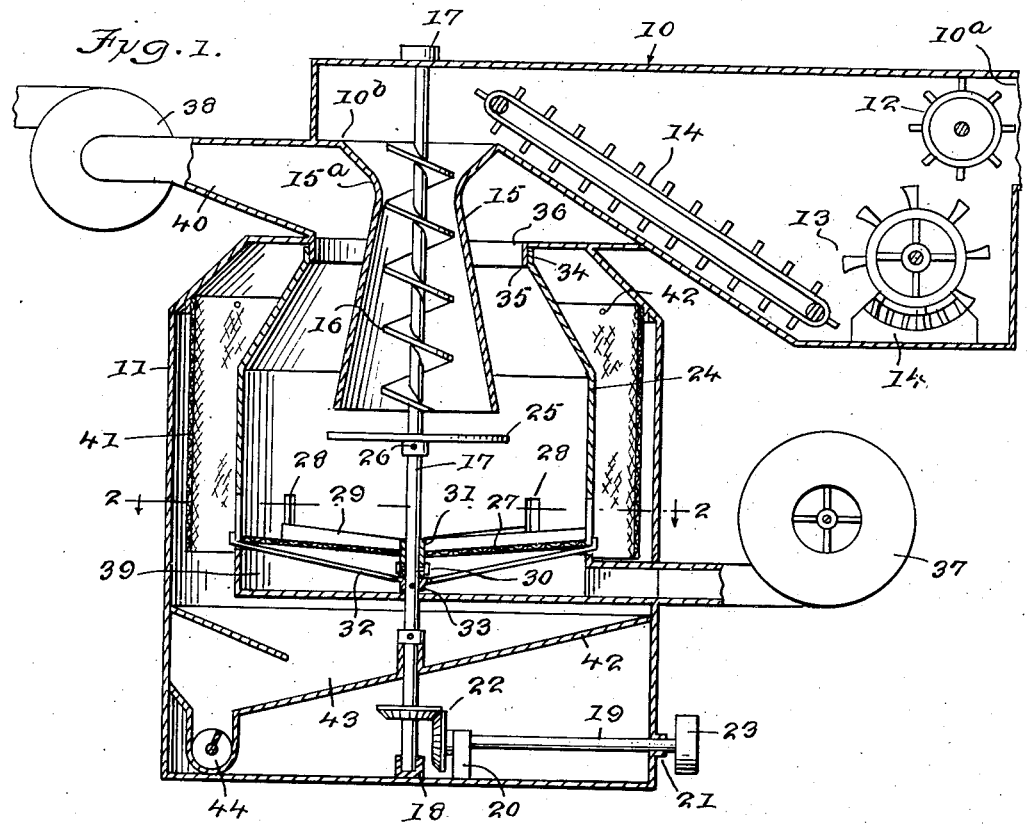
Figure 1 is a sectional view of the invention.
Figure 2:
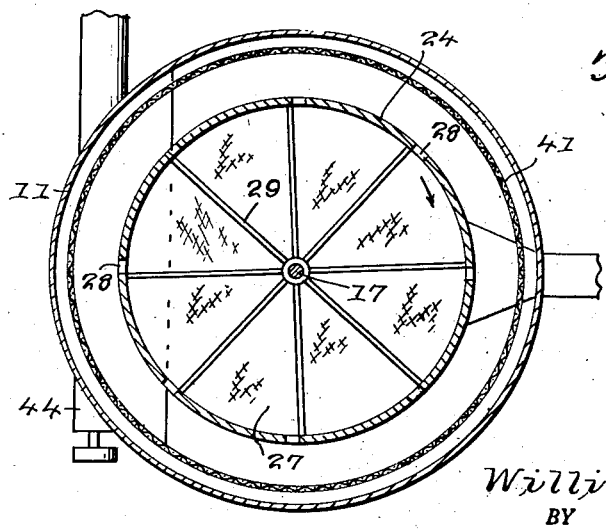
Figure 2 is a cross sectional view of the invention.

The separator comprises horizontally and vertically disposed casings 10 and 11, respectively. The horizontal casing is provided at one end thereof with an inlet opening 10a which is located in the upper portion of said end of the casing. The horizontal casing 10 is provided in the lower side thereof near its other end with an outlet opening 10b. The vertical casing 11 extends downwardly from this end of the horizontal casing 10. The separator is adapted to be mounted upon a combine in such manner as to effect the delivery of the thrashed straw into the horizontal casing 10 through the inlet opening 10a of the latter. A spreader 12 is mounted within the horizontal casing 10 directly opposite the inlet opening 10a of this casing, and a cylinder 13 and concave 13a are located within this casing directly below the separator 12. The thrashed straw is delivered from the cylinder 13 and concave 14 to the discharge opening 10b and the casing 10 by means of an elevator 14.

A chute 15 receives the thrashed straw from the horizontal casing 10. The chute 15 has a flared upper end 15a which is in communication with the outlet opening 10b of the horizontal casing 10. The main or body portion of the chute 15 is of substantially conical formation. The thrashed straw is forced through the chute 15 by an auger 16 which is equal in length to the chute and which is mounted upon a shaft 17. The shaft 17 extends in an axial direction through the chute 15 and has its upper and lower ends journaled in bearings 17 and 18, respectively. The bearing 17 is carried by the top of the horizontal casing 10, and the bearing 18 is carried by the bottom of the vertical casing 11. A horizontal shaft 19 is rotatably mounted in bearings 20 and 21 carried by the vertical casing 10. The shaft 19 is connected to a vertical shaft 17 by bevel gears 22 and it is provided at its outer end with a pulley 23 to enable it to be driven from the combine.

A drum 24 is mounted within the vertical casing 11. The chute 15 extends into a drum 24 to deliver the thrashed straw thereto. A disk 25 fixed as at 26, on the shaft 17 immediately below the lower or discharge end of the chute 15 scatters the thrashed straw about the drum 24 as the straw is delivered from the chute.

The separation of the grain from the chaff and the straw takes place within the drum 24. The drum 24 is provided with a foraminous bottom 27 made of wire cloth. It is provided in its side wall with openings 28 extending upwardly from the bottom 27. Blades 29 are mounted within the drum 24 on the bottom 27 of the drum. The bottom 27 is secured as at 30 to the shaft 17, and the blades 29 are secured as at 31 to the shaft. Braces 32, secured as at 33 to the shaft 17 have their ends secured to the lower edge of the drum 24. The drum is suported from the shaft 17 by the braces 32 and it is connected by the braces to the shaft for rotation therewith. The upper end of the drum 24 is provided with an annular bearing flange 34 which surrounds a bearing collar 35 extending downwardly from the upper side of the vertical casing 11 about the opening 36 in said side of the casing.

Air is caused to flow through the drum 24 by a blower 37 and a suction fan 38. The air from the blower 37 is delivered to a cylindrical pan 39 fixed within the vertical casing 11 immediately below the drum 24. The fan 38 is connected to the outlet opening 36 of the drum 24 by a pipe 40. A canvas apron 41 of cylindrical formation is secured, as at 42, within the vertical casing 11, in surrounding relation to the drum 24. A conical pan 42 is secured within the vertical casing 11 below the drum 24, and it is provided with a discharge opening 43 which communicates with a grain auger 44.

In practice, the drum 24, the blower 37 and suction fan 38 are operated from the combine. The auger 16, the scattering disk 25 and the radial blades 29 rotate with the drum 24. The thrashed straw is delivered from the combine to the spreader 12 and from the spreader to the cylinder 13 and concave 14. The thrashed straw is conveyed from the cylinder 13 and concave 14 to the upper end of the chute 15 and is forced downwardly through the chute by the auger 16. The disk 25 scatters the thrashed straw throughout the drum 24, in such a manner as to enable the air flowing through the drum to carry off the chaff. The grain recovered from the thrashed straw is forced by the blades 29 through the openings 28 of the drum 24. The grain strikes the canvas apron 41 and is directed thereby into the pan 42, and is conveyed from the pan by the auger 44.

It should be apparent from the foregoing, taken in connection with the accompanying drawing that the separator may be readily mounted upon a combine and several movable parts thereof driven from the power plant of the combine. The separator is highly efficient in operation and due to the manner in which the thrashed straw is treated within the drum 24 recovers substantially all of the grain left in the thrashed straw delivered from the combine. Furthermore, it will be seen that the separator is of simple construction and may be maintained in a highly efficient operating state in a comparatively easy manner and at a comparatively low cost.

I claim:

1. A grain separator comprising a rotary thrashed straw receptacle having a grain screen, said receptacle being provided with a blower and air inlet means below the receptacle, means for feeding thrashed straw and grain to the receptacle and discharging the grain, an apron forming a localized zone spaced from the walls of the receptacle to receive the grain, and an air suction means above the receptacle and communicating with said receptacle for causing the straw to float and ascend from the receptacle thereby to separate the latter from the grain.

2. A grain separator comprising a thrashed straw receptacle mounted for rotation about a vertical axis, said receptacle having a grain screen at its bottom, said receptacle being provided with a blower and air inlet means beneath said screen, means for feeding the thrashed straw into the receptacle, means for rotating the receptacle, and an air suction means above and communicating with said receptacle to evacuate the straw therefrom and separate the latter from the grain.

3. A grain separator comprising a casing, a drum rotatably mounted within the casing and having a perforated bottom, the drum being provided in its side wall near its bottom with grain outlet openings, a chute arranged within the upper portion of the drum, means for delivering thrashed straw to the upper end of the chute, an auger rotatably mounted within the chute, means for rotating the drum and auger, a stationary pan below and enclosing the perforated drum bottom, a blower discharging air to the pan for travel upwardly through the screen, a fan with its suction side connected to the top of the drum, and means below the pan for receiving grain discharged from the drum outlets, said means including a screw conveyor.

4. A grain separator as claimed in claim 3, comprising a flexible apron suspended within the casing about the drum and spaced from the walls of the casing and drum.

5. A grain separator as claimed in claim 3 wherein the means for rotating the drum and auger comprise a vertical shaft extending axially through the pan, the drum and chute and carrying the auger, braces fixed to the shaft and engaged with the lower end of the drum, and a horizontal shaft rotatably mounted in the casing and geared to the vertical shaft and provided with a driving pulley.

6. A grain separator as claimed in claim 3 wherein the upper end of the chute is flared and wherein the lower or body portion of the chute is of conical formation, and wherein a scattering disk is located below the lower end of the chute and supported and operated by the drum and auger rotating means.

7. A grain separator as claimed in claim 3, comprising blades mounted upon the perforated bottom of the drum, and a scattering disk located immediately below the chute and supported and rotated by the drum and auger rotating means.

WILLIAM O. LA FAVE.